US005788803A

United States Patent [19]

Sissons et al.

[11] Patent Number: 5,788,803

[45] Date of Patent: Aug. 4, 1998

[54] CORRUGATED PAPERBOARD MANUFACTURING APPARATUS WITH CONTROLLABLE PREHEATING

[75] Inventors: Anthony J. Sissons; David Alan Thomas, both of Gastonia, N.C.

[73] Assignee: Interfic, Inc., Dallas, N.C.

[21] Appl. No.: 731,531

[22] Filed: Oct. 16, 1996

[51] Int. Cl.$^6$ .............................. B32B 31/00; G05G 15/00

[52] U.S. Cl. .............................. 156/359; 156/361; 156/362; 156/470; 156/499; 156/583.1; 34/553

[58] Field of Search .............................. 156/359, 361, 156/362, 470, 499, 583.1; 34/553; 219/244, 388, 392, 400, 448

[56] References Cited

U.S. PATENT DOCUMENTS

| | | | |
|---|---|---|---|
| 252,547 | 1/1882 | Thompson . | |
| 746,807 | 12/1903 | Ferres . | |
| 2,252,585 | 8/1941 | Swanson et al. | 34/160 |
| 2,300,982 | 11/1942 | Slagboom et al. | 38/2 |
| 2,941,573 | 6/1960 | Cassady | 154/32 |
| 2,944,345 | 7/1960 | Faeber | 34/56 |
| 3,004,880 | 10/1961 | Lord | 156/64 |
| 3,064,869 | 11/1962 | Cooper | 226/110 |
| 3,217,425 | 11/1965 | Nikkel | 34/49 |
| 3,296,712 | 1/1967 | Sachs | 34/158 |
| 3,319,353 | 5/1967 | Matsunami et al. | 34/155 |
| 3,346,159 | 10/1967 | Winkler | 226/92 |
| 3,712,843 | 1/1973 | Gartaganis et al. | 156/499 |
| 3,726,023 | 4/1973 | Geyken et al. | 34/151 |
| 3,800,434 | 4/1974 | Edgington et al. | 34/155 |
| 3,811,987 | 5/1974 | Wilkinson et al. | 156/497 |
| 3,851,403 | 12/1974 | Maurischat et al. | 34/48 |
| 3,878,622 | 4/1975 | Knechtel et al. | 34/95 |
| 3,920,496 | 11/1975 | Wilkinson et al. | 156/82 |
| 3,923,583 | 12/1975 | Bianchini | 156/499 X |
| 3,957,558 | 5/1976 | Lee et al. | 156/212 |
| 3,981,758 | 9/1976 | Thayer et al. | 156/64 |
| 4,086,116 | 4/1978 | Yazaki et al. | 713/172 |
| 4,126,508 | 11/1978 | Hoelzinger | 156/512 |
| 4,128,677 | 12/1978 | Hoelzinger | 428/57 |
| 4,134,781 | 1/1979 | Carstens et al. | 156/64 |
| 4,142,301 | 3/1979 | Coodall | 34/18 |
| 4,161,269 | 7/1979 | Kirkpatrick | 226/92 |

(List continued on next page.)

FOREIGN PATENT DOCUMENTS

| | | | |
|---|---|---|---|
| 1437861 | 6/1976 | United Kingdom | 156/499 |
| 2 233 935 | 1/1991 | United Kingdom | B32B 31/08 |
| 2 289 901 | 12/1995 | United Kingdom . | |

OTHER PUBLICATIONS

International Paper Board Industry, Jan. 1993, pp. 33–36.

Proceedings Providing a Worldwide Forum for Educational and Professional Growth, 1992, pp. 103–108.

*Primary Examiner*—David A. Simmons
*Assistant Examiner*—Paul M. Rivard
*Attorney, Agent, or Firm*—Allen, Dyer, Doppelt, Milbrath & Gilchrist, P.A.

[57] ABSTRACT

A corrugated paperboard manufacturing apparatus includes one or more preheaters upstream from the double-facer for preheating the component sheets for the corrugated paperboard. A preheater preferably includes an electrically powered heater positioned adjacent a second surface portion of a preheater body for heating the preheater body so that heat is transferred to the component sheet contacting a first surface portion of the body. The first surface portion of the preheater body contacts the component sheet as the component sheet is advanced along the path of travel. The electrically powered heater is positioned adjacent the second surface portion of the preheater body for radiantly heating the preheater body. The temperature of the component sheet delivered to the double-facer from the preheater can be readily controlled to ensure high quality corrugated paperboard. In one embodiment, the preheater body may be provided by a rotating roll. Accordingly, the first and second surface portions may be at different angular positions relative to the rotating roll. In another embodiment, the preheater body comprises a plate, and wherein the first and second surface portions are on opposite sides of the plate. Method aspects of the invention are also disclosed.

54 Claims, 9 Drawing Sheets

U.S. PATENT DOCUMENTS

| | | | |
|---|---|---|---|
| 4,169,007 | 9/1979 | Pray | 156/380 |
| 4,268,341 | 5/1981 | Huhne | 156/353 |
| 4,306,932 | 12/1981 | Bradatsch | 156/462 |
| 4,316,755 | 2/1982 | Flaum et al. | 156/205 |
| 4,402,778 | 9/1983 | Goldsworthy | 156/172 |
| 4,467,537 | 8/1984 | Trotscher | 34/155 |
| 4,495,021 | 1/1985 | Goldsworthy | 156/425 |
| 4,526,634 | 7/1985 | Beer | 156/64 |
| 4,544,597 | 10/1985 | Peer, Jr. et al. | 428/182 |
| 4,556,444 | 12/1985 | Schommler | 156/359 |
| 4,655,163 | 4/1987 | Hokenson | 118/62 |
| 4,662,554 | 5/1987 | Yamazaki et al. | 226/170 |
| 4,764,236 | 8/1988 | Nikkel | 156/21 |
| 4,806,183 | 2/1989 | Williams | 156/64 |
| 4,871,406 | 10/1989 | Griffith | 156/82 |
| 4,887,362 | 12/1989 | Rautakorpi | 34/41 |
| 4,889,580 | 12/1989 | Seki et al. | 156/182 |
| 5,049,216 | 9/1991 | Shead et al. | 156/64 |
| 5,094,394 | 3/1992 | Saukkonen | 242/55 |
| 5,181,330 | 1/1993 | Schoch | 34/162 |
| 5,244,518 | 9/1993 | Krayenhagen et al. | 156/64 |
| 5,249,373 | 10/1993 | Rogne et al. | 34/120 |
| 5,256,240 | 10/1993 | Shortt | 156/470 |
| 5,292,391 | 3/1994 | Wallick | 156/205 |
| 5,348,610 | 9/1994 | McKinlay et al. | 156/472 |
| 5,437,752 | 8/1995 | Lang | 156/210 |
| 5,456,783 | 10/1995 | Sissons | 156/210 |
| 5,466,329 | 11/1995 | Marschke | 156/470 |
| 5,495,092 | 2/1996 | Marschke et al. | 219/388 |
| 5,498,304 | 3/1996 | Shaw et al. | 156/210 |
| 5,501,762 | 3/1996 | Marschke et al. | 156/470 |
| 5,662,765 | 9/1997 | Titz et al. | 156/470 |

AIR
CONTROLLER
M

RETRACTOR
CONTROLLER
M

CONTROLLER

CORRUGATED PAPERBOARD MANUFACTURING APPARATUS WITH CONTROLLABLE PREHEATING

FIELD OF THE INVENTION

The present invention relates to the field of corrugated paperboard manufacturing, and more particularly, to an apparatus and method for preheating component sheets during the making of corrugated paperboard.

BACKGROUND OF THE INVENTION

Corrugated paperboard is widely used as a material for fabricating containers and for other packaging applications. Corrugated paperboard is strong, lightweight, relatively inexpensive, and may be recycled. Conventional corrugated paperboard is constructed of two opposing liners and an intervening fluted sheet secured together using an adhesive. The adhesive is typically a starch-based adhesive applied as a liquid. Accordingly, heat is transferred to the paperboard to dry or set the adhesive during the manufacturing of the paperboard.

A conventional so-called double-facer for setting the adhesive includes a series of steam heating chests over which the paperboard is advanced. A conveyor belt engages the upper surface of the board and advances the board along the heating chests. A series of rolls is typically used to provide backing pressure to the back side of the conveyor belt. Accordingly, the paperboard is pressed into contact with the underlying steam heating chests.

Unfortunately, the steam heating chests have a tendency to bow or deflect due to temperature differences thereby producing low quality paperboard. This problem is explained in greater detail in U.S. Pat. No. 5,456,783 to Sissons. The Sissons patent discloses a significant advance in the art of corrugated paperboard manufacturing wherein a series of contact assemblies provide backing pressure to the conveyor belt rather than conventional backing rolls. The contact assemblies include independently mounted and biased contact shoes, mounted in side-by-side relation. The contact shoes can readily conform to any bowing of the steam heating chests. The contact assemblies are readily installed, and operated with greatly reduced maintenance, especially compared to conventional backing rolls and their associated bearings. Because heat transfer to the paperboard is also increased, less heating chests may be used and ambient energy losses reduced further.

Overall control of the many parameters of a corrugating apparatus to produce paperboard without warp, for example, presents a substantial difficulty. The use of recycled materials having shorter fibers is also more likely to cause warp in the finished paperboard sheet. U.S. Pat. No. 5,244,518 to Krayenhagen et al., for example, discloses an overall computer control system for a corrugator and wherein controlled parameters include the steam delivered to the heating chests, and the number of rollers providing backing pressure. U.S. Pat. No. 4,806,183 to Williams discloses an apparatus including a microprocessor controlling the individual feed rates of the single-faced sheets and the rotational speeds of glue applicator rolls based upon motor speed signals and a tachometer signal generated at the output end of the double-facer.

U.S. Pat. No. 3,981,758 to Thayer et al. discloses a corrugator wherein several variables are automatically controlled and other variables are manually controlled. For example, board warp is determined by visual inspection, and the number of backing rolls, preheating temperatures, and additional water sprayed on the sheets may be adjusted to correct for the warp. Similarly, U.S. Pat. No. 5,244,518 to Krayenhagen et al. discloses an overall computer control system for a corrugator wherein the steam delivered to the heat chests, and the number or rollers providing backing pressure can be changed by the controller to regulate heat delivered to the advancing paperboard sheet.

U.S. Pat. No. 5,049,216 to Shead et al. discloses measuring the moisture content of the top and bottom liners of a corrugated paperboard sheet, on a slice-by-slice basis, prior to or after bonding to the corrugating medium. Water is controllably sprayed onto the individual cross-directional slices as needed so that the liners have the same moisture content profiles. Infrared reflectance moisture sensors are used to measure the moisture content to determine how much moisture is to be added.

U.S. Pat. No. 3,004,880 to Lord discloses a series of laterally spaced apart switches for detecting up curl or down curl of the paperboard downstream from the double-facer. The switches affect changes in preheating of the liners, and/or fluted medium upstream of the double-facer, which, in turn, affects the moisture content of the component liners for the board. The preheating is changed by advancing or retarding the position of wrap arms associated with the preheating drums. Radiation pyrometers are also used to sense the various temperatures. Unfortunately, switches are subject to fouling, especially in the high-moisture and adhesive environment of a corrugator.

U.S. Pat. No. 4,134,781 to Carstens et al. discloses an apparatus for controlling warp via on-line moisture application to one or both sides of the heat-bonded paperboard sheet while it is still hot from the heat bonding operation and prior to its being cut into individual sheets. The patent further discloses that the proper selection of the amount of moisture and its placement will of necessity be a matter of trial and error for each particular production run; however, an operator observes the condition of the cut sheets to obtain feedback to adjust the variables.

A conventional preheater for a liner or component sheet of corrugated paperboard uses steam supplied to the interior of a rotating roll to preheat the liner passing over the roll as shown, for example, in U.S. Pat. No. 4,086,116 to Yazaki et al. The amount of preheat is typically varied by changing the arc of contact between the advancing liner and the steam heated roll. Unfortunately, the amount of preheat and its controllability is limited in a conventional steam preheater. A steam preheater also has relatively complex steam connections and energy loses through the steam connections.

U.S. Pat. No. 5,348,610 to McKinlay et al. discloses an alternative to steam for preheating a liner wherein a heater is positioned adjacent the glue roll for inputting energy in the form of radiant or convected heat, microwave or other energy. Unfortunately, as the heat is applied directly to the moving paper liner adjacent the glue roll, controllability of preheating may be difficult.

SUMMARY OF THE INVENTION

In view of the foregoing background it is therefore an object of the present invention to provide a corrugated paperboard manufacturing apparatus and associated method for supplying controllable preheating to the component sheets or liners for making corrugated paperboard.

This and other objects, features and advantages of the present invention are provided by an apparatus comprising electrically powered heating means positioned adjacent a second surface portion of a preheater body for heating the preheater body so that heat is transferred to the component sheet contacting a first surface portion of the body. In other words, the apparatus includes preheater means which, in turn, includes: advancing means for advancing the component sheet along a path of travel; the preheater body positioned along the path of travel of the component sheet; and the electrically powered heater. A double-facer is positioned downstream from the preheater means for heating a corrugated paperboard sheet formed from the plurality of component sheets to set adhesive in the corrugated paperboard sheet. The temperature of the component sheets delivered to the double-facer from the preheating means can be readily controlled to ensure high quality corrugated paperboard.

In one embodiment, the preheater body may be provided by a rotating roll. Accordingly, the first and second surface portions may be at different angular positions relative to the rotating roll. In other embodiments, the preheater body comprises a flat or arcuate plate, and wherein the first and second surface portions are on opposite sides of the plate.

To further ensure consistent contact and, hence, good temperature regulation of the advancing liner, the preheater may further include pressure applying means positioned opposite the first surface portion of the preheater body for applying pressure to urge the component sheet against the first surface portion of the preheater body. The pressure applying assembly may preferably comprise a sliding contact assembly. The sliding contact means may preferably be provided by a plurality of contact shoes each having a contact surface for directly slidably contacting the advancing component sheet, and biasing means operatively connected to the contact shoes for biasing the contact surfaces against the advancing component sheets.

The electrically powered heater may preferably comprise a base, and an electrical heating element on the base. Heater mounting means preferably positions the electrical heating element in closely spaced relation from the second surface portion of the preheater body for radiantly heating the body. Moreover, the electrical heating element preferably has a predetermined corrugated shape to accommodate thermal cycling, and is arranged in an alternating back and forth pattern on the base.

Yet another aspect of the apparatus in accordance with the present invention is that temperature control means is preferably provided for controlling a preheated temperature of the component sheet. For example, the preheated control means may comprise means for controlling a speed of the liner along the path of travel. In other words, the dwell time of the advancing component sheet on the preheater body may be controlled. The temperature of the preheater body may also be readily controlled. For the embodiment wherein the preheater body is a rotating roll, the temperature control means may include means for controlling an arc of contact for the component sheet on the roll.

A method aspect of the invention is for preheating a component sheet during manufacturing of corrugated paperboard. The method preferably comprises the steps of: advancing a component sheet along a path of travel; positioning a preheater body along the path of travel of the component sheet so that a first surface portion of the preheater body contacts the component sheet as the component sheet is advanced along the path of travel; and heating a second surface portion of the preheater body using an electrically powered heater so that heat is transferred to the component sheet from the preheater body. The step of positioning the preheater body, in one embodiment, preferably comprises positioning a rotating roll along the path of travel of the component sheet, and wherein the first and second surface portions are at different angular positions on the rotating roll. In another embodiment, the step of positioning the preheater body preferably comprises positioning a plate along the path of travel of the component sheet, and wherein the first and second surface portions are on opposite sides of the plate.

DETAILED DESCRIPTION OF THE PREFERRED EMBODIMENTS

Figure 1:
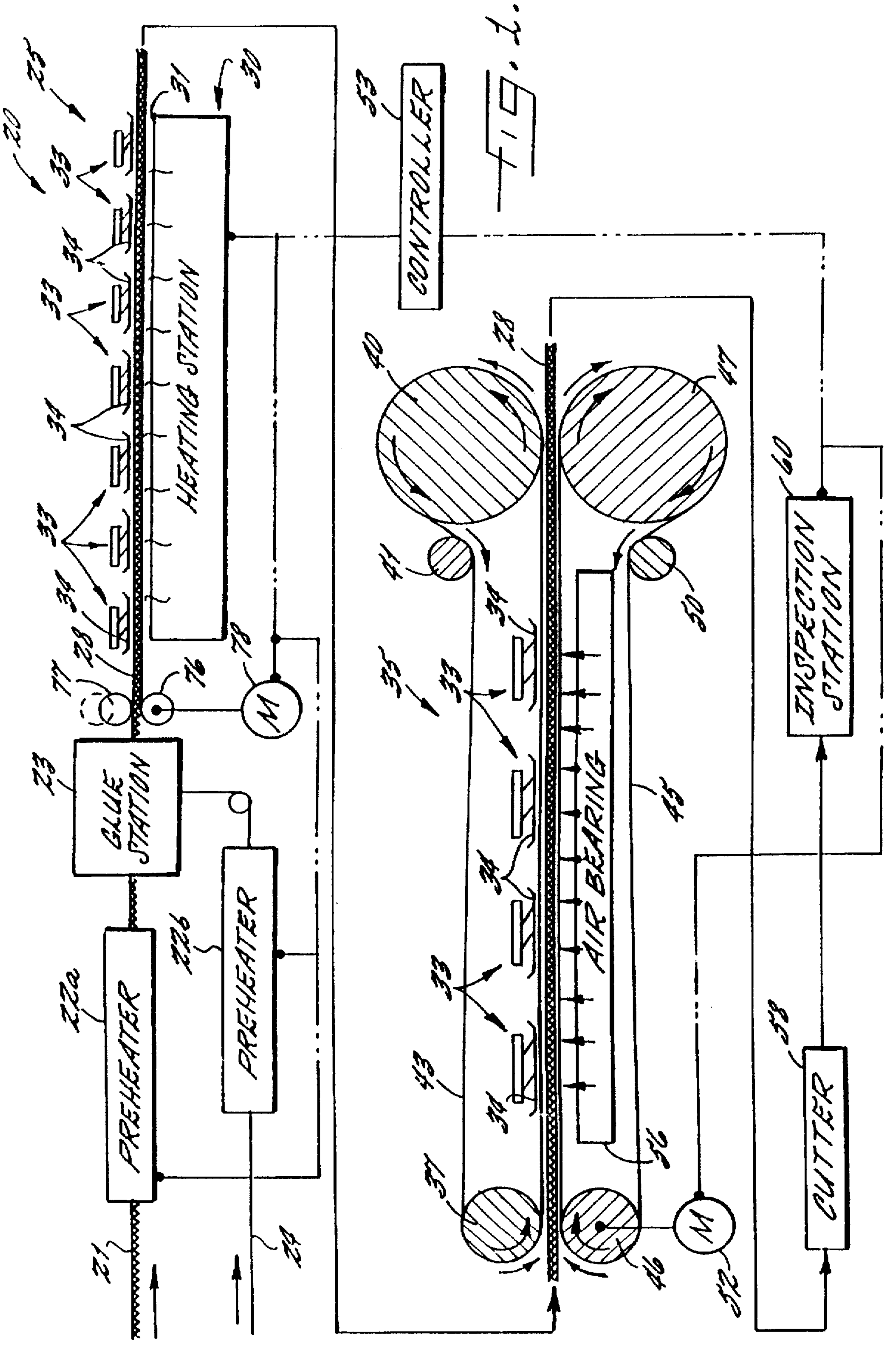
FIG. 1 is a schematic side view diagram of the apparatus in accordance with the present invention.

The present invention now will be described more fully with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

The corrugated paperboard apparatus 20 in accordance with the present invention is initially explained with reference to FIG. 1. The apparatus 20 includes one or more preheaters 22 upstream from a double-facer 25. A glue or adhesive station 23 is positioned between the preheaters 22 and the double-facer 25. The glue station 23 applies glue to the flute tips of the single-faced sheet 21 and joins the single-faced sheet to the liner 24. Thus formed corrugated paperboard sheet 28 advances along the predetermined path of travel over the heating section 30. Backing pressure is provided by the series of schematically illustrated sliding contact assemblies 33 which, in turn, include a plurality of side-by-side shoes 34 described in greater detail below.

Take-up means 35 is provided downstream from the double-facer 25 to draw the corrugated paperboard sheet 28 along the predetermined path of travel through the double-facer. The take-up means includes the illustrated set of upper rolls 37, 40 and 41 over with the upper traction belt 43 is guided. A lower traction belt 45 is similarly guided over the illustrated rolls 46, 47 and 50. A motor 52 drives the lower traction belt 45, and may also drive the upper belt 43 in synchronization with the lower belt, and under the control of the illustrated controller 53 as would be readily understood by those skilled in the art.

In the illustrated embodiment of the take-up means 35, a plurality of contact assemblies 33 and their associated contact shoes 34 are used to provide backing pressure to the upper traction belt 43. One or more air bearings 56 may be used to reduce the friction of the advancing lower traction belt 45. The air bearing may be provided by a chamber having a plurality of openings in an upper surface and through which air is forced by connection to a source of pressurized air, as would be readily appreciated by those skilled in the art. Those of skill in the art will also readily appreciate that the contact assemblies 33 and air bearing 56 may be switched from their illustrated positions, or used with each other, for example.

Downstream from the take-up means 35, a slitter or cutter 58 cuts the advancing corrugated paperboard sheet 28 into a plurality of cut panels. Downstream from the cutter 58 is the illustrated inspection station 60 as described in greater detail below.

Figure 3:
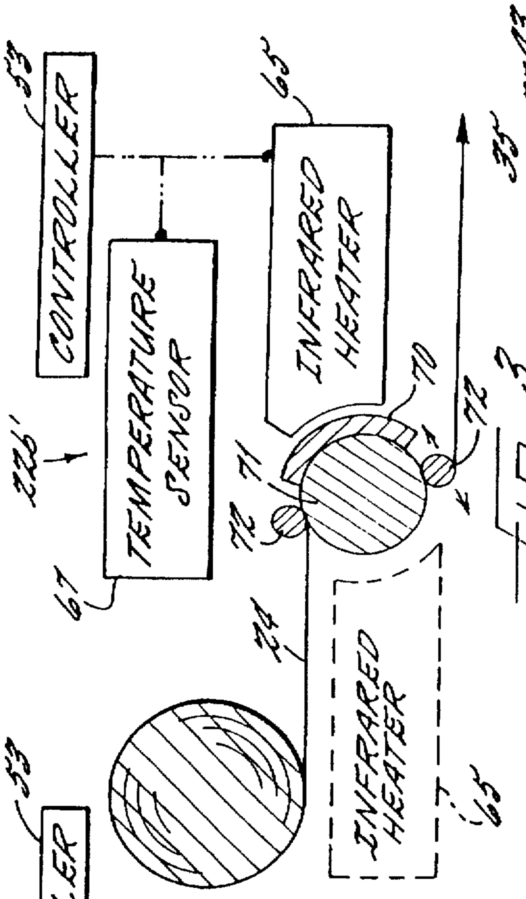
FIG. 3 is a schematic diagram of another preheater of the apparatus in accordance with the present invention.
Figure 2:
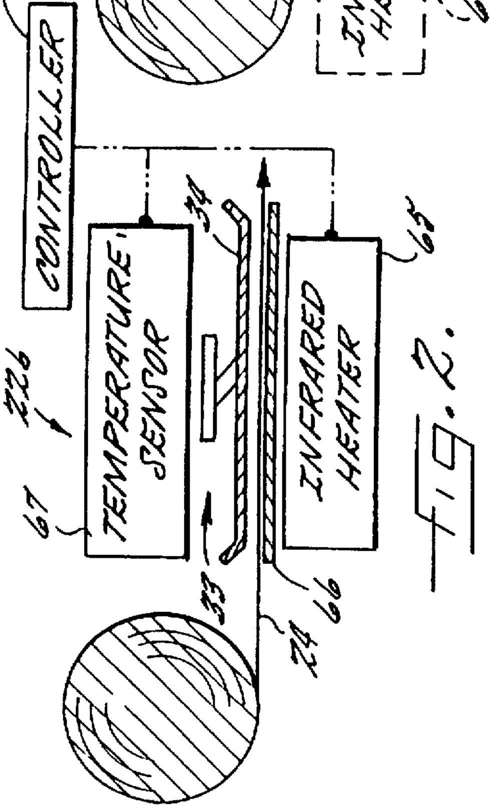
FIG. 2 is a schematic diagram of a preheater of the apparatus as shown in FIG. 1.

Turning now additionally to FIGS. 2 and 3, the advantageous aspects of preheating of the component sheets 21, 24 of the corrugated paperboard 28 are explained. In FIG. 2 the illustrated preheater 22*a* includes electrically powered infrared heating means 65 positioned adjacent a second surface portion of a preheater body for heating the preheater body so that heat is transferred to the liner 24 contacting a first surface portion of the body as the liner is advanced along the path of travel to the double-facer 25. In the illustrated embodiment, the preheater body is provided by a flat plate 66. The heater 65 may preferably be of the type as described below with reference to the heating section 30 of the double-facer 25.

The temperature of the sheets 21, 24 delivered to the double-facer 25 from the preheating means can be readily controlled to ensure high quality corrugated paperboard. More particularly, the illustrated controller 53 may control the heater 65 to maintain the temperature of the component sheets 21, 24 within a predetermined range responsive to the schematically illustrated temperature sensor 67. The temperature sensor 67 may a thermocouple associated with the plate 66, and/or an optical pyrometer for sensing the temperature of the component sheet 24, for example, as would be readily understood by those skilled in the art.

To further ensure consistent contact and, hence, good temperature regulation of the advancing liner 24, the preheater 22*a* may further include pressure applying means positioned opposite the first surface portion of the preheater plate 66 for applying pressure to urge the liner 24 against the first surface portion of the preheater plate. The pressure applying means may preferably be provided by the schematically illustrated sliding contact assembly 33 with its plurality of contact shoes 34 each having a contact surface for directly slidably contacting the advancing liner. Biasing means is also operatively connected to the contact shoes 34 for biasing the contact surface of each of the shoes against the advancing liner. The biasing means may be provided by a spring or a fluid bladder, for example, as would be readily appreciated by those skilled in the art.

In one of the embodiments of the preheater 22*a*' illustrated in FIG. 3, the preheater body may be provided by an arcuate plate 70 positioned against the liner 24 which, in turn, is advanced over a rotating roll 71. In other words, this embodiment is similar to the flat plate embodiment described above, but adapted for use with a rotating roll as commonly used in conventional steam preheaters.

Another preheater embodiment is also illustrated in FIG. 3, wherein the roll 71 provides the preheater body. The first and second surface portions of the preheater body may be at different angular positions relative to the rotating roll 71. The roll 71 is precisely heated by the heater 65. The contact arc of the liner 24 on the roll 71 may also be controlled by moving the illustrated wrap arms 72 as would be readily understood by those skilled in the art. The speed of the advancing liner 24 may also be controlled by the controller 53 to thereby ensure proper heating of the liner 24 to produce high quality paperboard of course, the singled-faced sheet 21 may also be preheated by the preheater embodiments described herein as would be readily understood by those skilled in the art.

Figure 4:
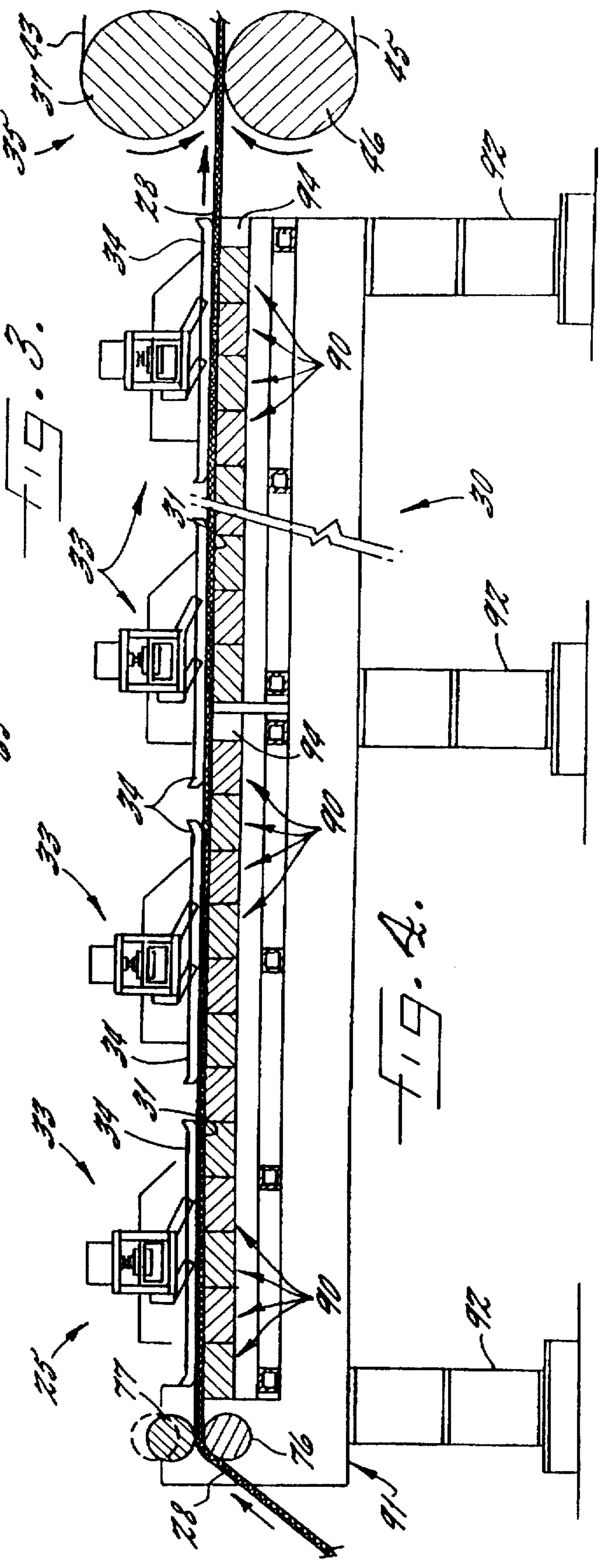
FIG. 4 is a schematic cross-sectional view of the heating section of the apparatus as shown in FIG. 1.

Referring now additionally to FIG. 4 the beltless operation of the double-facer 25 in accordance with the present invention is described in greater detail. Because the conventional conveyor belt is not used to advance the paperboard sheet 28 over the heating section 30, the present invention provides take-up means 35 downstream from the heating section 30 for advancing the corrugated paperboard sheet along its desired path of travel adjacent the heating surface 31 of the heating section. Initial sheet feeding means is provided for initially feeding a leading portion of the corrugated paperboard sheet 28 along the path of travel.

Sliding contact means in the form of the illustrated contact assemblies 33 is positioned opposite the heating surface 31 of the heating section 30 for slidably contacting and applying pressure to urge the advancing corrugated paperboard sheet 28 against the heating surface 31. The contact assemblies 33 include a plurality of contact shoes 34 mounted in side-by-side relation and biased toward the heating surface 31. Accordingly, heat is transferred from the heating surface 31 to the advancing corrugated paperboard sheet 28. Moreover, maintenance difficulties associated with a conventional conveyor belt are avoided. In addition, energy losses are reduced and the uniformity of pressure supplied to the advancing corrugated paperboard sheet is increased.

The illustrated heating section 30 includes a plurality of electrically powered heaters 90 carried by a frame 92. The frame 91 illustratively includes a plurality of legs 91. Those of skill in the art will recognize that the take-up and initial sheet feeding features of the present invention that do away the need for a conventional conveyor belt may be readily adapted to a conventional steam heating section including a plurality of steam heating chests, as well as to the heating section 30 including electrically powered heaters 90 according to another significant advantage of the present invention.

Figures 5, 6, 7:
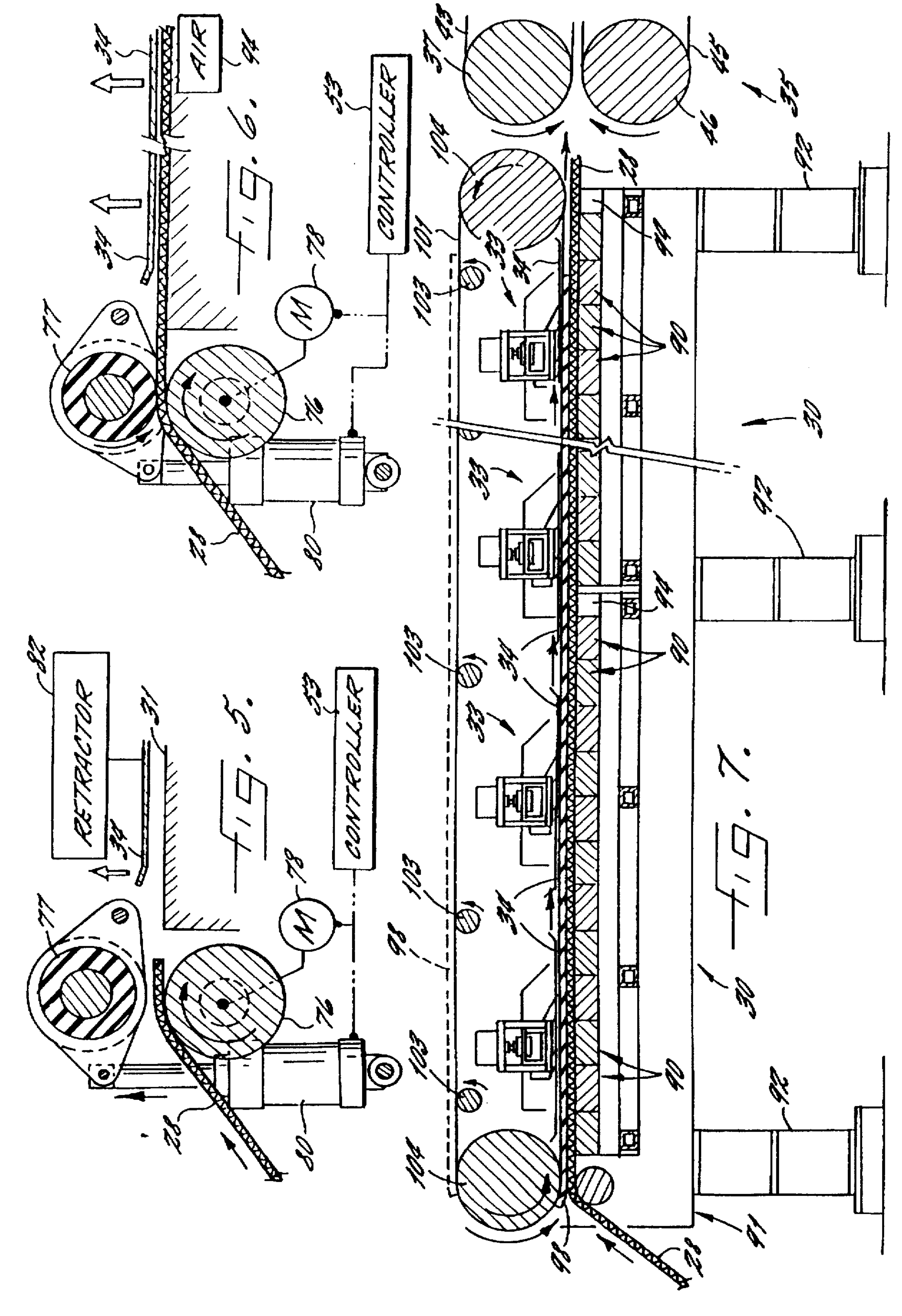
FIGS. 5 and 6 are schematic cross-sectional views of an embodiment of an initial sheet feeder of the apparatus in accordance with the present invention.
FIG. 7 is a schematic cross-sectional view of another embodiment of an initial sheet feeder of the apparatus in accordance with the present invention.
Figure 8:
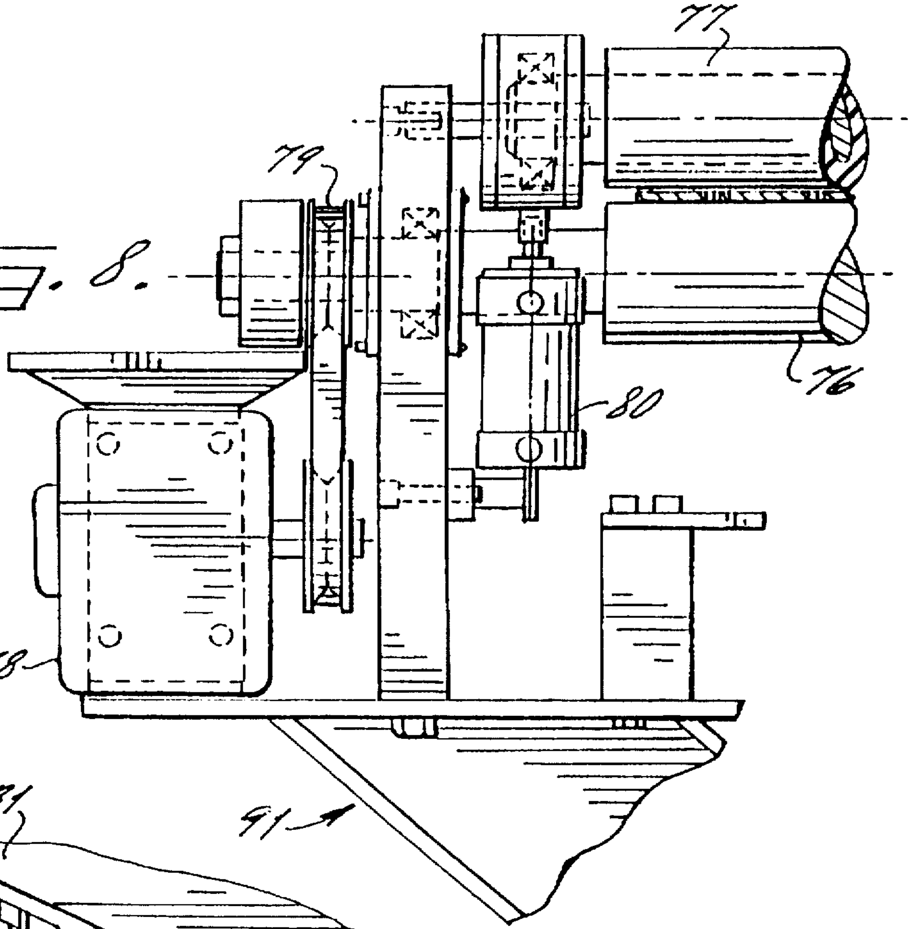
FIG. 8 is a front view of a portion of an initial sheet feeder as shown in FIGS. 5 and 6.
Figure 9:
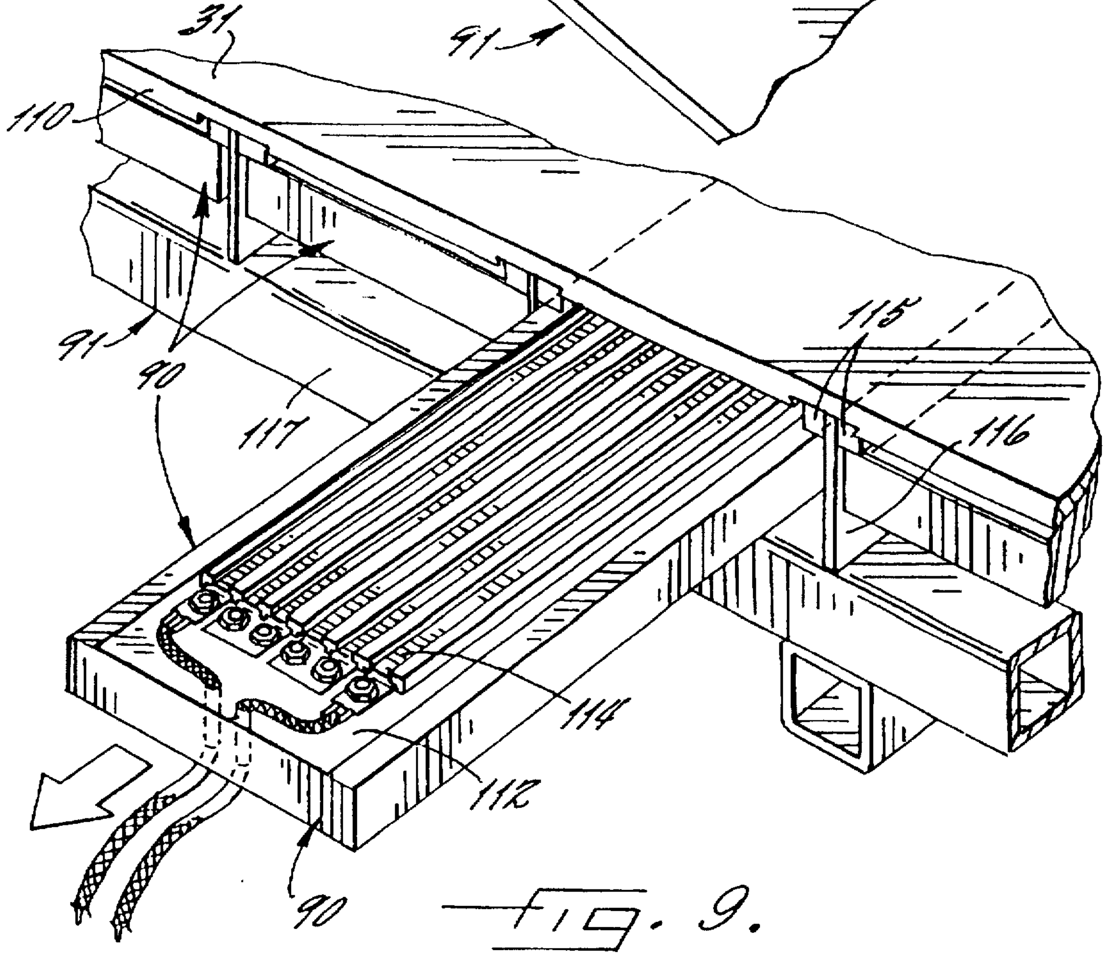
FIG. 9 is perspective view of an electrically powered heater partially withdrawn from the heating section of the apparatus in accordance with the present invention.
Figure 10:
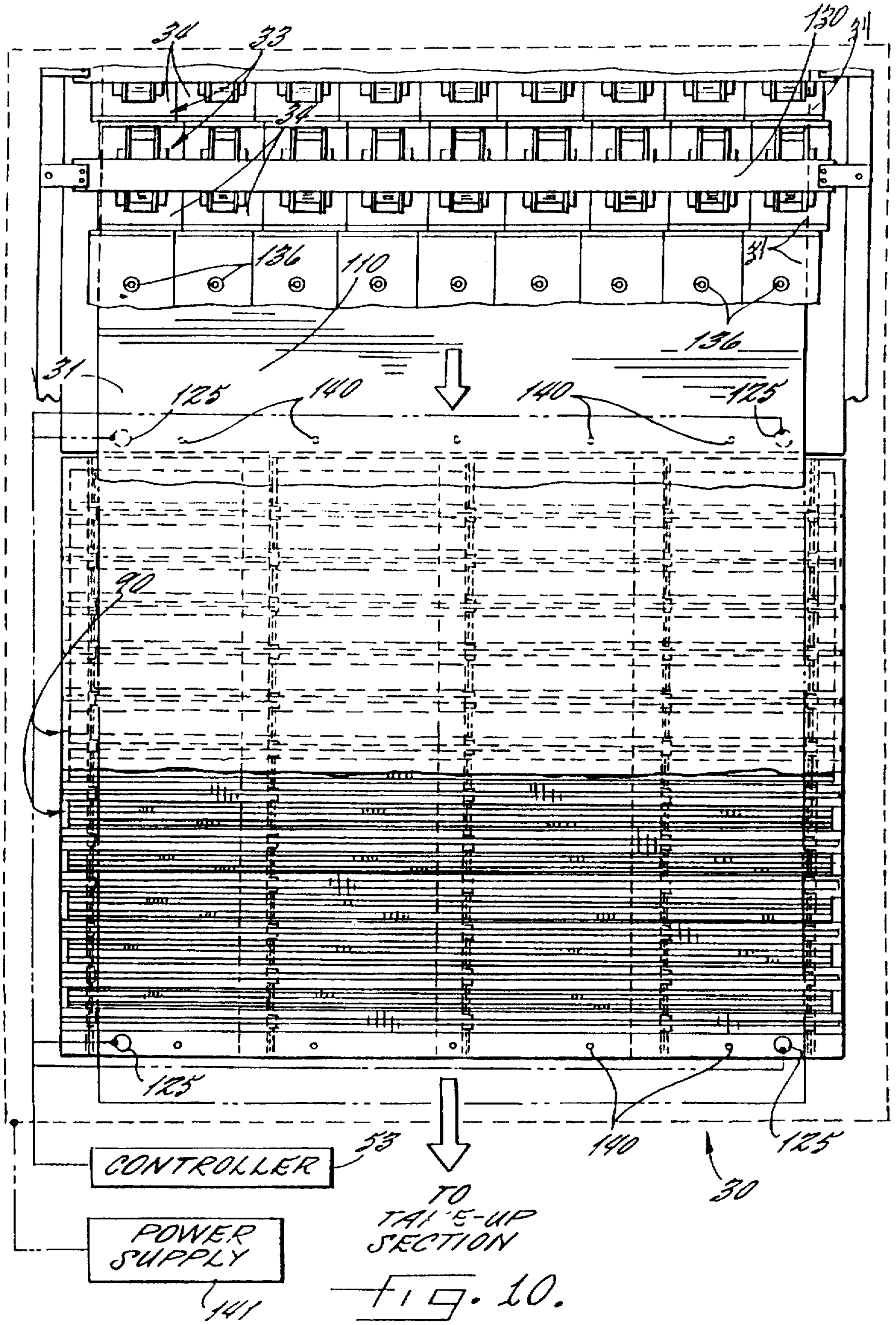
FIG. 10 is a fragmentary top plan view of a portion of the heating section of the apparatus in accordance with the present invention.

The initial sheet feeding means may be provided in one embodiment by a pair of opposing rolls 76, 77 and an associated drive motor 78 as shown FIGS. 5, 6 and 8. A drive belt 79 (FIG. 8) may connect the motor output to the lower roll 76. The rolls 76, 77 are positioned upstream of the heating surface 31 for initially engaging and advancing the leading portion of the corrugated paperboard sheet 28. The leading edge may first be manually advanced to the position shown in FIG. 5. The cylinder 80 is then lowered to bring the upper roll 77 into engagement with the sheet. The lower roll 76 is rotated to advance the leading edge of the sheet 28 to the take-up means 35.

The double-facer 25 also preferably includes pressure relief means, cooperating with the initial sheet feeding means, for releasing pressure applied by the contact assemblies 33 to the corrugated paperboard sheet 28 when the initial sheet feeding means is feeding the leading portion of the corrugated paperboard sheet 28. In one embodiment, the pressure relief means preferably comprises retraction means or a retractor 82 for retracting the sliding contact pressing means away from heating surface when the initial sheet feeding means is feeding the leading portion of the corrugated paperboard sheet. For example, the retractor 82 may be provided by a plurality of pneumatic cylinders or other similar actuators operatively connected to raise the contact assemblies 33. Alternatively, the retractor 82 could be means for reducing the backing pressure applied by the contact assemblies 33, such as a pressure relief valve, for the embodiment wherein the contact assemblies include fluid filled bladders to provide the biasing means.

Gas cushion means is also preferably provided for cooperating with the initial sheet feeding means for providing a gas cushion to thereby reduce friction between the heating surface 31 and the corrugated paperboard sheet 28 when initially feeding the leading portion of the corrugated paperboard sheet. As shown schematically in FIG. 6 the gas cushion means may be provided by air bearings 94 or chambers having openings therein defined at spaced locations along the series of heaters 90 of the heating section 30. The air bearings 94 may be connected to a controllable source of pressurized air as would be readily understood by those skilled in the art.

Another embodiment of the initial sheet feeding means is explained with particular reference to FIG. 7. Board engaging means is provided for engaging the leading portion of the corrugated paperboard sheet 28. Advancing means is provided for advancing the board engaging means for feeding the leading portion of the corrugated paperboard sheet. In the illustrated embodiment, the board engaging means is provided by a mat 98. The mat 98 may be provided by a portion of a conventional conveyor belt, for example, which for a retrofit installation is no longer needed in its entirety according to an advantage of the present invention. The mat 98, when in the lower position as shown in FIG. 7, is positioned in overlying relationship with the leading portion of the corrugated paperboard sheet 28 and frictionally engages the sheet to advance the sheet to the take-up means 35. The mat 98 is advanced to a raised or storage position, illustrated by the dotted outline, after the initial feeding is completed.

The advancing means is illustratively provided by a pair of endless loops 101 extending adjacent the heating surface 31 on opposite longitudinal sides thereof. The loops 101 are connected to the board engaging mat 98 for advancing the mat as described above. The loops 101 are driven by opposing end rolls 104. In addition, when the mat 98 is in the storage position, it is supported by the upper support rolls 103 as illustrated. The mat 98 and advancing means allow the board 28 to be engaged and moved over the heating surface 31 and initially fed to the take-up means 35 without a complicated structure for grasping and then releasing the leading edge portion of the board 28. Rather, the board 28 is frictionally engaged, and released to the take-up means at the downstream end as the mat 98 is further advanced to the storage position. Other similar approaches are also contemplated in accordance with the initial sheet feeding aspect of the present invention as would be readily understood by those skilled in the art.

Yet another aspect of the invention is that the conventional steam heating chests may be replaced by electrically powered heaters 90 configured to radiantly heat the back side of the heating surface as understood with further reference to FIGS. 9–13. The heating surface 31 may be provided one or more heating plates 110 which, in turn, are heated by the heaters 90. The heating plate 110 has opposing surfaces with the illustrated upper surface contacting the corrugated paperboard sheet 28 and defining the heating surface 31. The electrically powered heater 90 preferably includes a base 112, and an electrical heating element 114 on the base.

The base 112 is mounted so that the electrical heating element 114 is positioned in closely spaced relation from the lower surface of the heating plate 110 so that the electrical heating element radiates heat to the heating plate. Those of skill in the art will recognize that some of the heat is also transferred by convection, as well as conduction. The base 112 for the electrical heating element 114 may be elongate and mounted to extend transverse to the path of travel of the corrugated paperboard sheet 28. The electrically powered heaters 90 are readily controllable, and can efficiently and controllably deliver heat to the paperboard sheet 28 via the intervening heating plates 110. Accordingly, the conventional steam heating chests are not used and their associated drawbacks are overcome.

Another aspect of the invention is that the electrical heating element 114 preferably has a predetermined corrugated shape to accommodate thermal cycling as would be readily appreciated by those skilled in the art. The electrical heating element 114 is also preferably arranged in an alternating back and forth pattern on the base 112 as shown in the illustrated embodiment to facilitate electrical connection from one side of the heater 90.

The heating section 30 also includes the frame 91, and heating plate mounting means for mounting the heating plate 110 on the frame. In one embodiment, the heating plate mounting means preferably comprises heating plate thermal expansion accommodating means for accommodating thermal expansion of the heating plates 110 relative to the frame. The thermal expansion may be accommodated in the transverse direction by providing the heating plate 110 with a plurality of transverse slots, and slidably engaging edge portions 115 of a plurality of transverse support members 116 within the transverse slots. In other words, the upper edge portion 115 of each transverse support member 116 and the associated transverse slot may be configured to define a dovetail joint to hold the plate 110 securely to the frame 91, while permitting thermal expansion.

The frame 91 preferably further comprises a plurality of frame members 117 extending in a direction generally parallel to the path of travel of the corrugated paperboard sheet 28. The heating plate thermal expansion accommodating means may include respective brackets 121 connecting adjacent portions of the frame members 117 and the transverse support members 116. The brackets 121 may each have a U-shaped upper end portion receiving the transverse support member portion as illustrated. The U-shaped upper end portion may be secured to the transverse support members 116 via the illustrated rods 123 which pass through aligned openings in the bracket 121 and transverse support members 116.

Figures 12, 13:
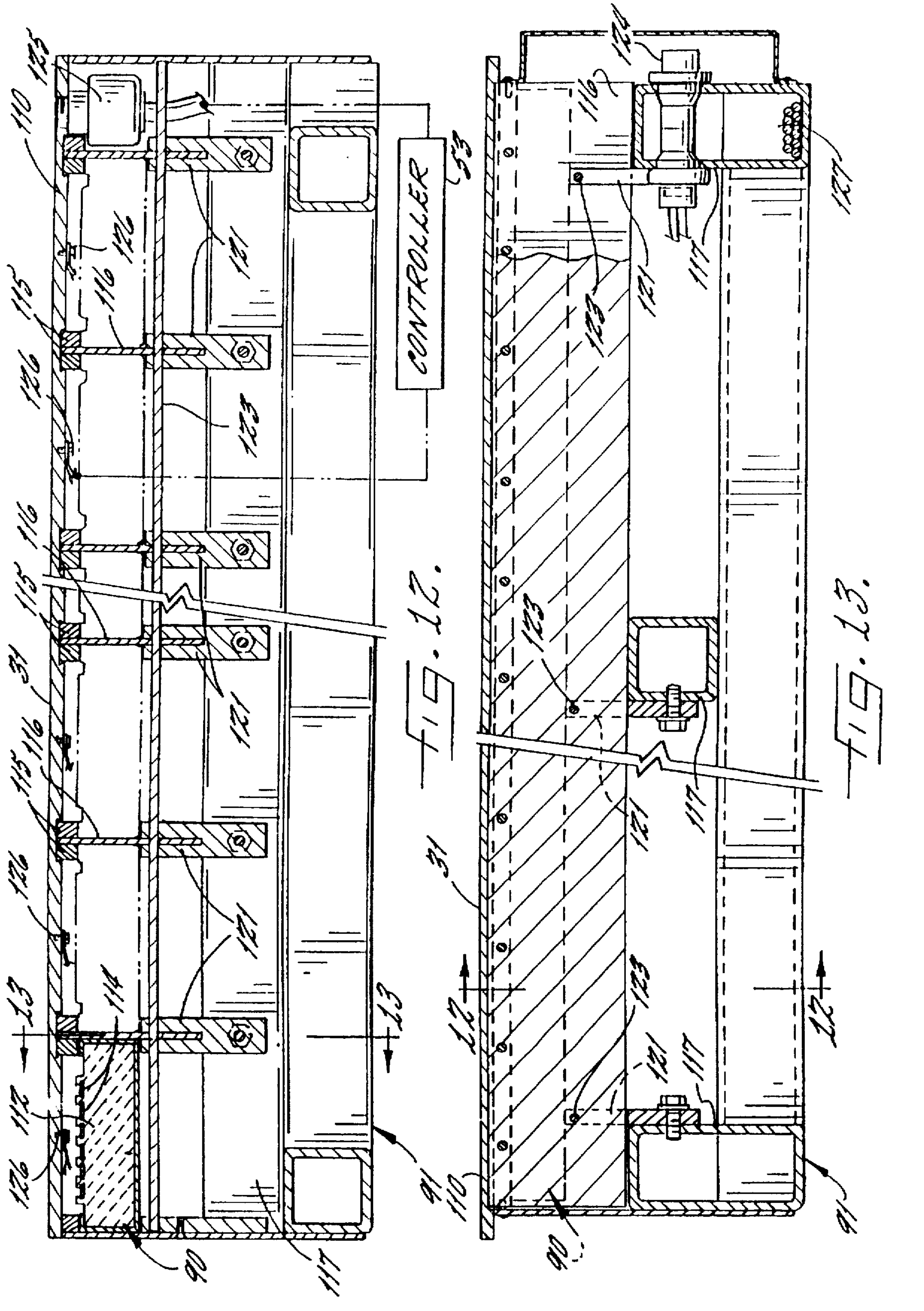
FIG. 12 is a cross-sectional view of the heating section taken along lines 12—12 of FIG. 13.
FIG. 13 is a cross-sectional view of the heating section taken along lines 13—13 of FIG. 12.

As also shown in FIGS. 12 and 13, various electrical devices and their associated wiring may also be readily carried by the heating section 30. For example, a series of thermocouples 126 may be embedded in or positioned adjacent the heating plate 110 and these thermocouples connected to the processor or controller 53 for real time monitoring of various temperatures over the heating section 30. In addition, one or more optical pyrometers 125 may be positioned to monitor the temperature of the advancing corrugated paperboard sheet 28 as would also be readily understood by those skilled in the art. Other switches 124 and wiring 127 may also be mounted to or carried by the frame 91 of the heating section 30. The controller 53 preferably monitors a plurality of inputs and controls a plurality of system parameters. For example, the thermocouples 126 and pyrometers 125 may be monitored to control the temperature of the heaters 90, such as by controlling the electrical power delivered to the heaters from the AC power source 141 as would be readily understood by those skilled in the art.

Figure 11:
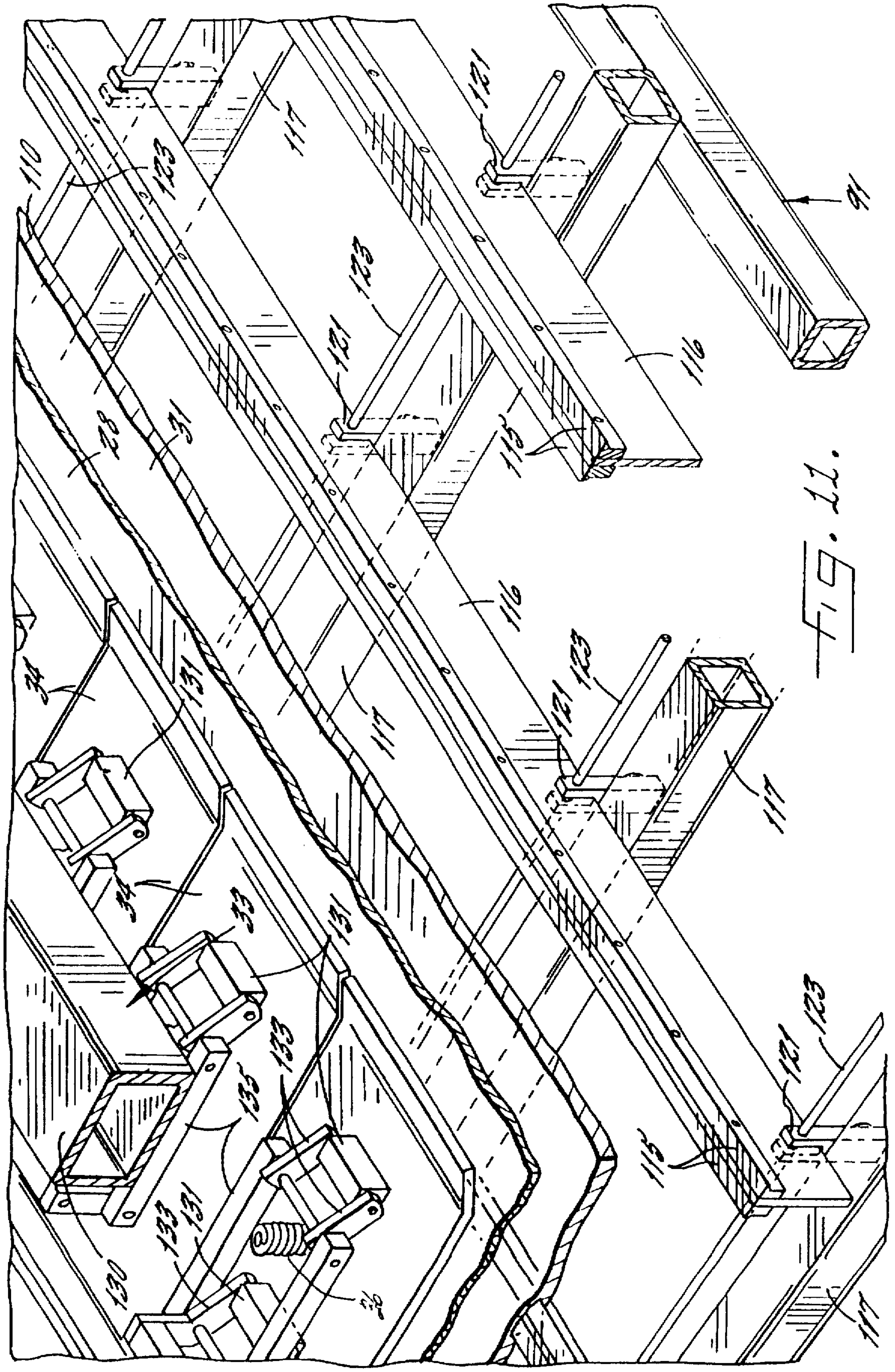
FIG. 11 is an enlarged fragmentary perspective view of a portion of the heating section illustrating the mounting arrangement of the heating plates and heaters of the apparatus in accordance with the present invention.

Focussing now briefly on a portion of FIG. 11, the contact assemblies 33 as may be used in various sections of the apparatus are further described. The contact assembly 33 includes a transverse frame member 130 from which a plurality of contact shoes 34 are mounted. Each shoe 34 is mounted by the illustrated blocks 131, connecting arms 133, and upper supports 135. The contact assemblies 33 may be moved between operating and retracted positions by a retractor 82 as described in greater detail above. A spring 136 provides the biasing means in the illustrated embodiment, although in other embodiments, a controllably filled fluid bladder may also be used to provide the biasing. The contact assembly 33 may also include other features as described in U.S. Pat. No. 5,456,783, the entire disclosure of which is incorporated herein by reference.

Referring more specifically again to FIG. 10, the openings 140 for providing the gas cushion for initially feeding the corrugated paperboard sheet 28 are shown. These openings 140 are connected in fluid communication with the air manifold 94 (FIGS. 6 and 7).

Figure 14:
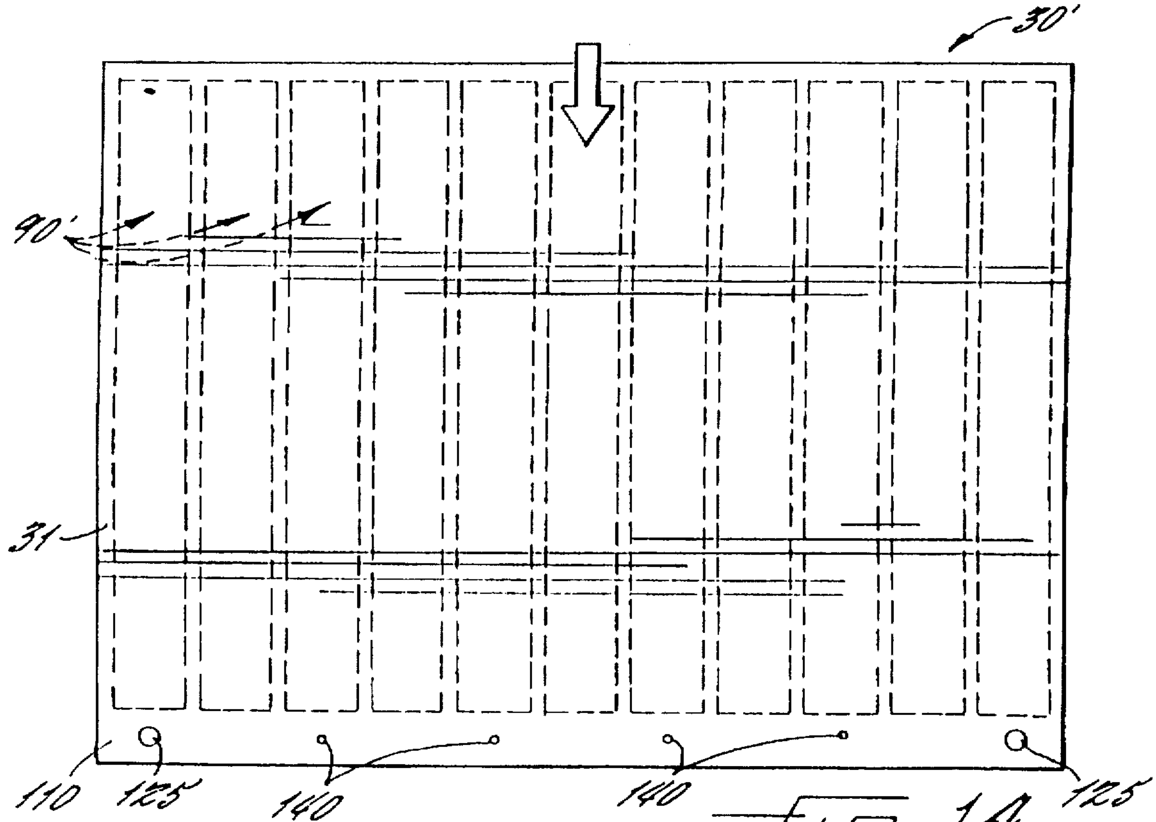
FIG. 14 is a top plan view of an alternate embodiment of a heating section in accordance with the present invention.
Figure 15:
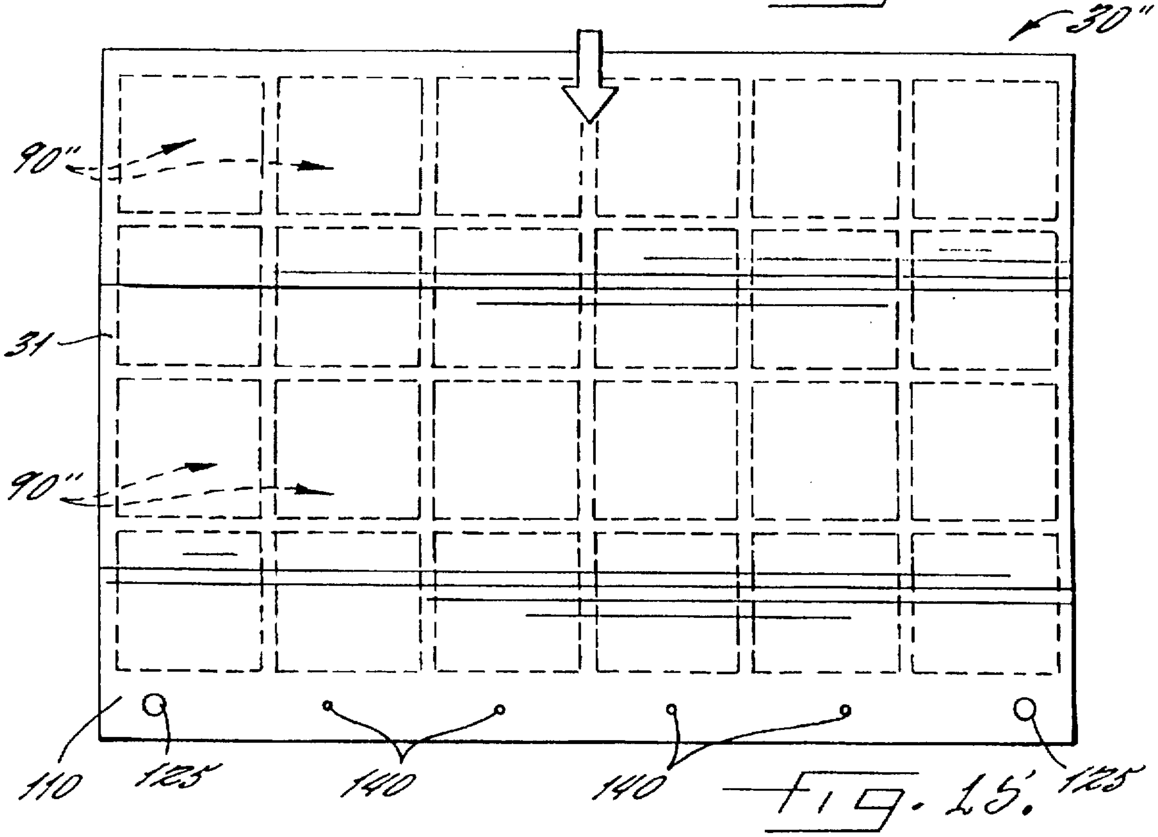
FIG. 15 is a top plan view of yet another embodiment of a heating section in accordance with the present invention.

As shown in the alternate embodiment of FIG. 14, the heaters 90' are arranged parallel to the path of travel in the heating section 30'. Heating could thus be controlled in elongate longitudinal bands across the heating surface 31 of the heating plate 110. Yet another embodiment of a heating section 30" is explained with reference to FIG. 15. In the illustrated embodiment of FIG. 15, the heaters 90" are generally square to provide yet more precise control of heating if desired for certain applications. Those of skill in the art will recognize that other configurations of heaters 90 are also contemplated by the invention.

Figures 16, 17:
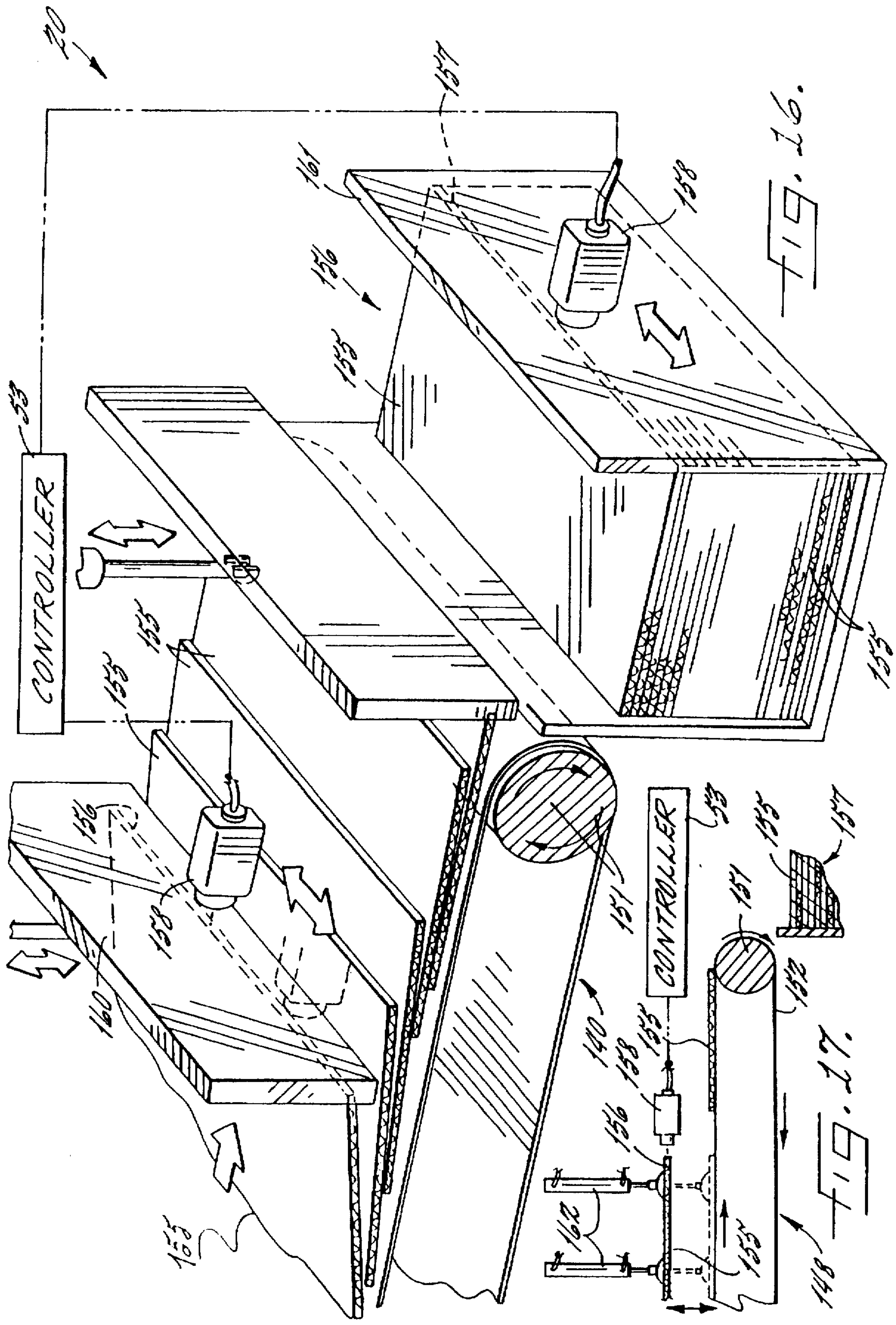
FIG. 16 is a schematic perspective view of embodiments of a board profile inspection station in accordance with the present invention.
FIG. 17 is a schematic side view of another embodiment of a board profile inspection station in accordance with the present invention.

Yet another significant aspect of the invention provides near real time monitoring of the board quality produced at the output of the double-facer 25 so that operating parameters can be adjusted to produce high quality flat board without any crushing or moisture streaks, for example. In other words, warp is greatly reduced. Referring now additionally to FIGS. 16 and 17, the profile sensing according to this aspect of the invention is described. The apparatus 20 includes the cutter 58 downstream from the double-facer 25 (FIG. 1). More particularly, board edge profile sensing means is positioned downstream from the cutter 58 for sensing a profile of a cut edge 156 of a cut panel 155.

A conveyor 140, provided by the illustrated conveyor belt 152 and roll 151, preferably carries the cut panels 155 away from the cutter and toward a stacker 157. The board edge profile sensing means may be positioned adjacent the conveyor 140 or the stacker 157. The board edge profile sensing means may be an optical sensor, and, more preferably, may be a camera 158 as shown in the illustrated embodiment of the upper left hand portion of FIG. 16.

The board edge profile sensing means associated with the conveyor 140 also illustratively includes selecting means for selecting a predetermined cut panel 155 for edge profile sensing from among the plurality of cut panels on the conveyor belt 152. In the embodiment shown in the upper left hand portion of FIG. 16, the selecting means may comprise a selector gate 160 having a transparent portion and being movable between raised and lowered positions, and wherein in the lowered position the selector gate presents the cut edge 156 of the predetermined cut panel 155 for edge profile sensing by the camera 158. The gate may also have openings therein, rather than transparent portions, to present the cut edge 156 to the camera 158.

The board profile sensing means also preferably includes scanning means for scanning the cut edge 156 of the cut panel 155. In one embodiment, the scanning means may be mechanical scanning means for advancing the camera 158 along the cut edge 156 of the cut panel 155 as would be readily understood by those skilled in the art. By mechanical scanning is meant that the camera 158 is physically moved relative to the cut edge, such as by a stepper motor or other electromechanical actuator, for example. In another embodiment, the scanning means may comprise optical scanning means for optically scanning the cut edge 156 of the cut panel 155 using mirrors or other optical components as would also be readily understood by those skilled in the art. Optical scanning means that the camera stays in position, but that optical components are used to direct an image of the cut edge 156 to the camera 158 as would also be readily understood by those skilled in the art.

As shown in the lower right hand portion of FIG. 16, the board edge profile sensing means may alternatively be provided by a camera 158 positioned adjacent the stacker 157. More particularly, the stacker 157 may include a transparent sidewall portion 161. Accordingly, the camera 158 may be scanned adjacent the cut edge 156 of a predetermined cut panel 155 through the transparent sidewall portion of the stacker 157. The sidewall may have one or more openings as an alternative to being transparent.

In yet another variation as shown in FIG. 17, the selector means may comprise lifting means for lifting the predetermined cut panel 155 from among the plurality of cut panels on the conveyor belt 152 for edge profile sensing. The illustrated lifting means is provided by a pair of vacuum suction arms 162 operating under control of the controller 53. The camera 158 is scanned along the cut edge 156 of the predetermined panel 155 using either mechanical or optical scanning means as would be readily understood by those skilled in the art.

The controller 53 controls the double-facer 25 responsive to the board edge profile sensing means to thereby reduce warp in the cut panels. Accordingly, near real time feedback may be used to adjust the upstream process to produce high quality paperboard. For example, the controller 53 may include heat control means for controlling heat transferred to the corrugated paperboard sheet 28 by the double-facer 25 and responsive to the board edge profile sensing means. The controller 53 may also comprise speed control means for controlling a speed of corrugated paperboard 28 through the double-facer 25 and responsive to the board edge profile sensing means. In addition, the controller 53 may also control the preheaters 22*a*, 22*b*, for controllably preheating components of the corrugated paperboard sheet upstream from the double-facer. In other words, each of the components/subsystems of the apparatus 20 may be desirably controlled by an overall system controller 53. As additional example, the contact assemblies 33 may be raised or lowered. The heat applied by the heaters 90 can be controlled for optimum overall performance in terms of quality and speed of production. Those of skill in the art will appreciate the significant advantages of feedback and controllability provided by the present invention.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. An apparatus for manufacturing corrugated paperboard from a plurality of component sheets, said apparatus comprising:

preheating means for preheating at least one component sheet for the corrugated paperboard, said preheating means comprising advancing means for advancing a component sheet along a path of travel, a preheater body positioned along the path of travel of the component sheet, said preheater body having first and second opposing major surface portions, the first major surface portion slidably contacting the component sheet as the component sheet is advanced along the path of travel, and an electrically powered heater positioned adjacent the second major surface portion of the preheater body for heating the preheater body so that heat is transferred to the component sheet from the preheater body as the first major surface portion slidably contacts the component sheet as the component sheet is advanced along the path of travel; and a double-facer downstream from said preheater means for heating a corrugated paperboard sheet formed from the plurality of component sheets to set adhesive in the corrugated paperboard sheet.

2. An apparatus according to claim 1 wherein said preheater body comprises a plate, and wherein the first and second surface portions are on opposite sides of said plate.

3. An apparatus according to claim 1 further comprising pressure applying means positioned opposite the first surface portion of said preheater body for applying pressure to urge the component sheet against the first surface portion of said preheater body.

4. An apparatus according to claim 3 wherein said pressure applying means comprises a sliding contact assembly.

5. An apparatus according to claim 4 wherein said sliding contact assembly comprises:

a plurality of contact shoes each having a contact surface for directly slidably contacting the advancing component sheet; and biasing means operatively connected to said contact shoes for biasing the contact surfaces of said shoes against the advancing component sheet.

6. An apparatus according to claim 5 wherein said biasing means comprises at least one spring.

7. An apparatus according to claim 1 wherein said electrically powered heater comprises:

a base; and an electrical heating element on said base.

8. An apparatus according to claim 7 further comprising heater mounting means for positioning said electrical heating element in closely spaced relation from the second surface portion of said preheater body for radiantly heating same.

9. An apparatus according to claim 7 wherein said base is elongate; and wherein said base mounting means positions said elongate base to extend transverse to the path of travel of the component sheet.

10. An apparatus according to claim 7 wherein said electrical heating element has a predetermined corrugated shape to accommodate thermal cycling.

11. An apparatus according to claim 7 wherein said electrical heating element is arranged in an alternating back and forth pattern on said base.

12. An apparatus according to claim 1 further comprising temperature control means for controlling a temperature of the component sheet.

13. An apparatus according to claim 12 wherein said temperature control means comprises means for controlling a temperature of said preheater body.

14. An apparatus according to claim 12 wherein said temperature control means comprises means for controlling a speed of the component sheet along the path of travel.

15. A preheater for a component sheet as the component sheet is advanced along a path of travel during manufacturing of corrugated paperboard, said preheater comprising:

a preheater body positioned along the path of travel of the component sheet, said preheater body having first and second opposing major surface portions, the first major surface portion slidably contacting the component sheet as the component sheet is advanced along the path of travel; and an electrically powered heater positioned adjacent the second major surface portion of the preheater body for heating the preheater body so that heat is transferred to the component sheet from the preheater body as the first major surface portion slidably contacts the component sheet as the component sheet is advanced along the path of travel.

16. A preheater according to claim 15 wherein said preheater body comprises a plate, and wherein the first and second surface portions are on opposite sides of said plate.

17. A preheater according to claim 15 further comprising pressure applying means positioned opposite the first surface portion of said preheater body for applying pressure to urge the component sheet against the first surface portion.

18. A preheater according to claim 17 wherein said pressure applying means comprises a sliding contact assembly.

19. A preheater according to claim 18 wherein said sliding contact assembly comprises:

a plurality of contact shoes each having a contact surface for directly slidably contacting the advancing component sheet; and biasing means operatively connected to said contact shoes for biasing the contact surfaces of said shoes against the advancing component sheet.

20. A preheater according to claim 19 wherein said biasing means comprises at least one spring.

21. A preheater according to claim 15 wherein said electrically powered heater comprises:

a base; and an electrical heating element on said base.

22. A preheater according to claim 21 further comprising heater mounting means for positioning said electrical heating element in closely spaced relation from the second surface portion of said preheater body for radiantly heating same.

23. A preheater according to claim 21 wherein said base is elongate; and wherein said base mounting means positions said elongate base to extend transverse to the path of travel of the component sheet.

24. A preheater according to claim 21 wherein said electrical heating element has a predetermined corrugated shape to accommodate thermal cycling.

25. A preheater according to claim 21 wherein said electrical heating element is arranged in an alternating back and forth pattern on said base.

26. A preheater according to claim 15 further comprising temperature control means for controlling a temperature of the component sheet.

27. A preheater according to claim 26 wherein said temperature control means comprises means for controlling a temperature of said preheater body.

28. A preheater according to claim 26 wherein said temperature control means comprises means for controlling a speed of the component sheet along the path of travel.

29. An apparatus for manufacturing corrugated paperboard from a plurality of component sheets, said apparatus comprising:

preheating means for preheating at least one component sheet for the corrugated paperboard, said preheating means comprising advancing means for advancing a component sheet along a path of travel, a preheater body comprising a rotating roll positioned along the path of travel of the component sheet, said rotating roll having first and second surface portions at different angular positions, the first surface portion contacting the component sheet as the component sheet is advanced along the path of travel, and an electrically powered heater positioned adjacent the second surface portion of the preheater body for heating the preheater body so that heat is transferred to the component sheet from the preheater body; and a double-facer downstream from said preheater means for heating a corrugated paperboard sheet formed from the plurality of component sheets to set adhesive in the corrugated paperboard sheet.

30. An apparatus according to claim 29 further comprising pressure applying means positioned opposite the first surface portion of said preheater body for applying pressure to urge the component sheet against the first surface portion of said preheater body.

31. An apparatus according to claim 30 wherein said pressure applying means comprises a sliding contact assembly.

32. An apparatus according to claim 31 wherein said sliding contact assembly comprises:

a plurality of contact shoes each having a contact surface for directly slidably contacting the advancing component sheet; and biasing means operatively connected to said contact shoes for biasing the contact surfaces of said shoes against the advancing component sheet.

33. An apparatus according to claim 29 wherein said electrically powered heater comprises:

a base; and an electrical heating element on said base.

34. An apparatus according to claim 33 further comprising heater mounting means for positioning said electrical heating element in closely spaced relation from the second surface portion of said preheater body for radiantly heating same.

35. An apparatus according to claim 33 wherein said base is elongate; and wherein said base mounting means positions said elongate base to extend transverse to the path of travel of the component sheet.

36. An apparatus according to claim 33 wherein said electrical heating element has a predetermined corrugated shape to accommodate thermal cycling.

37. An apparatus according to claim 33 wherein said electrical heating element is arranged in an alternating back and forth pattern on said base.

38. An apparatus according to claim 29 further comprising temperature control means for controlling a temperature of the component sheet.

39. An apparatus according to claim 38 wherein said temperature control means comprises means for controlling a temperature of said preheater body.

40. An apparatus according to claim 38 wherein said temperature control means comprises means for controlling a speed of the component sheet along the path of travel.

41. An apparatus according to claim 38 wherein said temperature control means comprises means for controlling an arc of contact for the component sheet on said roll.

42. A preheater for a component sheet as the component sheet is advanced along a path of travel during manufacturing of corrugated paperboard, said preheater comprising:

a preheater body positioned along the path of travel of the component sheet, said preheater body having first and second surface portions, the first surface portion contacting the component sheet as the component sheet is advanced along the path of travel; and an electrically powered heater positioned adjacent the second surface portion of the preheater body for heating the preheater body so that heat is transferred to the component sheet from the preheater body, said electrically powered heater comprising a base and an electrical heating element having a predetermined corrugated shape on said base to accommodate thermal cycling.

43. A preheater according to claim 42 wherein said preheater body comprises a rotating roll, and wherein the first and second surface portions are at different angular positions on said rotating roll.

44. A preheater according to claim 42 wherein said preheater body comprises a plate, and wherein the first and second surface portions are on opposite sides of said plate.

45. A preheater according to claim 42 further comprising pressure applying means positioned opposite the first surface portion of said preheater body for applying pressure to urge the component sheet against the first surface portion.

46. A preheater according to claim 45 wherein said pressure applying means comprises a sliding contact assembly.

47. A preheater according to claim 46 wherein said sliding contact assembly comprises:

a plurality of contact shoes each having a contact surface for directly slidably contacting the advancing component sheet; and biasing means operatively connected to said contact shoes for biasing the contact surfaces of said shoes against the advancing component sheet.

48. A preheater according to claim 42 further comprising heater mounting means for positioning said electrical heating element in closely spaced relation from the second surface portion of said preheater body for radiantly heating same.

49. A preheater according to claim 42 wherein said base is elongate; and wherein said base mounting means positions said elongate base to extend transverse to the path of travel of the component sheet.

50. A preheater according to claim 42 wherein said electrical heating element is arranged in an alternating back and forth pattern on said base.

51. A preheater according to claim 42 further comprising temperature control means for controlling a temperature of the component sheet.

52. A preheater according to claim 51 wherein said temperature control means comprises means for controlling a temperature of said preheater body.

53. A preheater according to claim 51 wherein said temperature control means comprises means for controlling a speed of the component sheet along the path of travel.

54. A preheater according to claim 51 wherein said preheater body is a rotating roll; and wherein said temperature control means comprises means for controlling an arc of contact for the component sheet on said roll.

* * * * *